Aug. 4, 1970  H. J. HASBROUCK  3,522,568

TAPE SCALE FOR POSITION MEASURING TRANSFORMER

Filed March 13, 1969  3 Sheets-Sheet 1

INVENTOR
HAROLD J. HASBROUCK
BY W. E. Beatty
ATTORNEY

Aug. 4, 1970  H. J. HASBROUCK  3,522,568
TAPE SCALE FOR POSITION MEASURING TRANSFORMER
Filed March 13, 1969  3 Sheets-Sheet 2
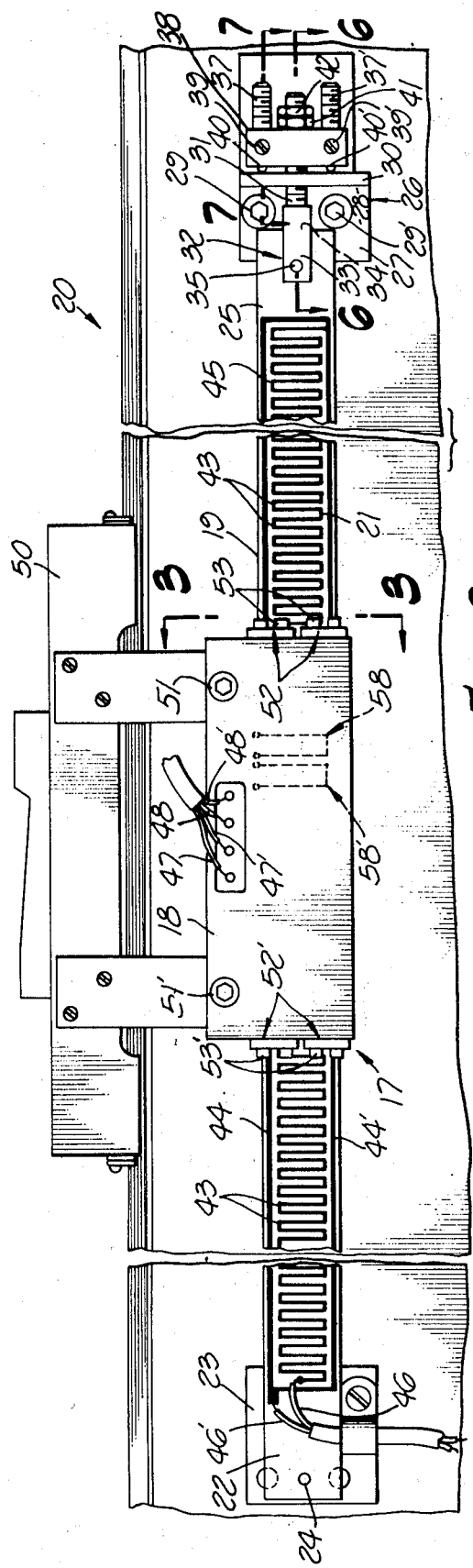
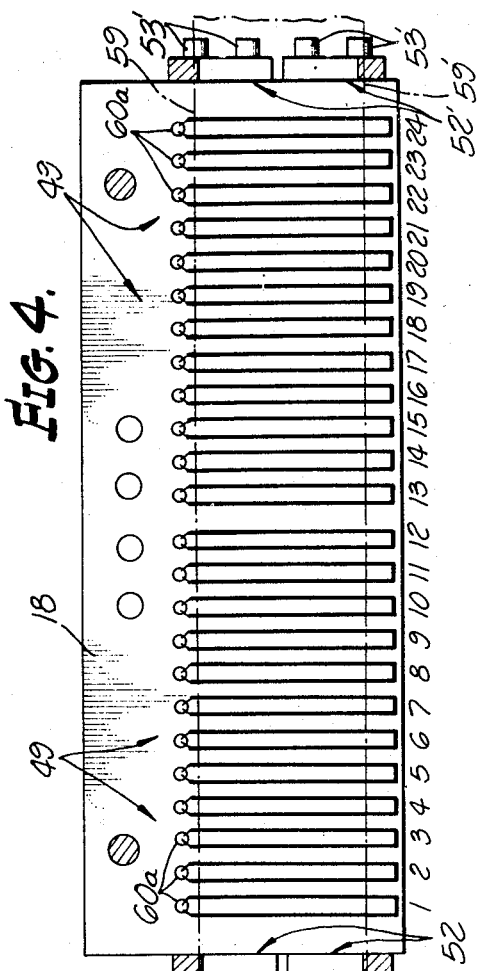
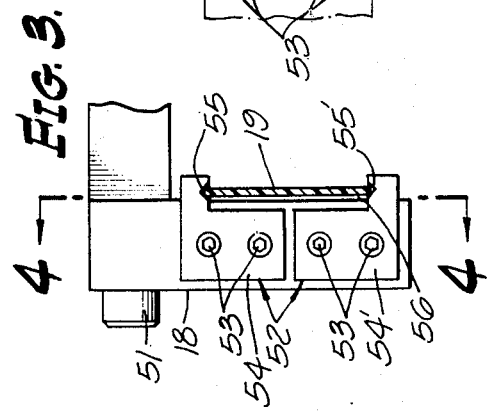
INVENTOR
HAROLD J. HASBROUCK
BY W.E. Beatty
ATTORNEY Aug. 4, 1970          H. J. HASBROUCK          3,522,568
TAPE SCALE FOR POSITION MEASURING TRANSFORMER
Filed March 13, 1969                    3 Sheets-Sheet 3
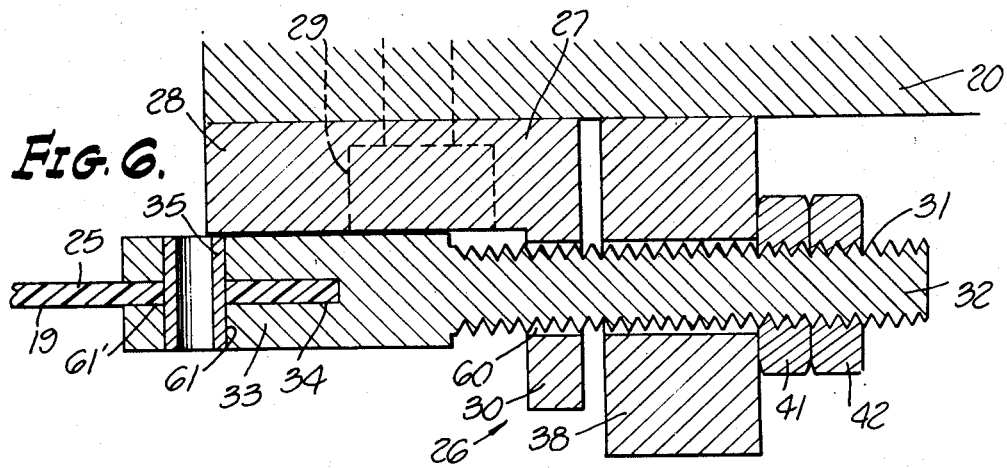
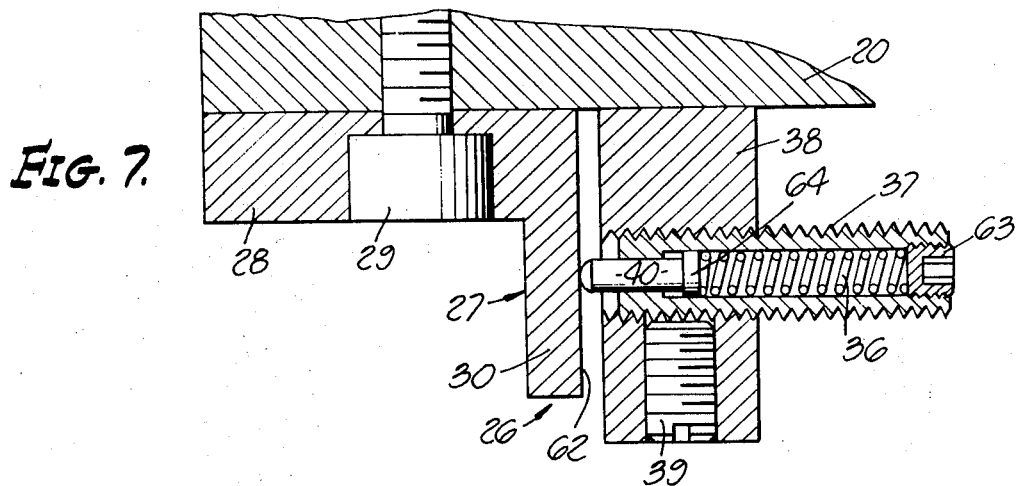
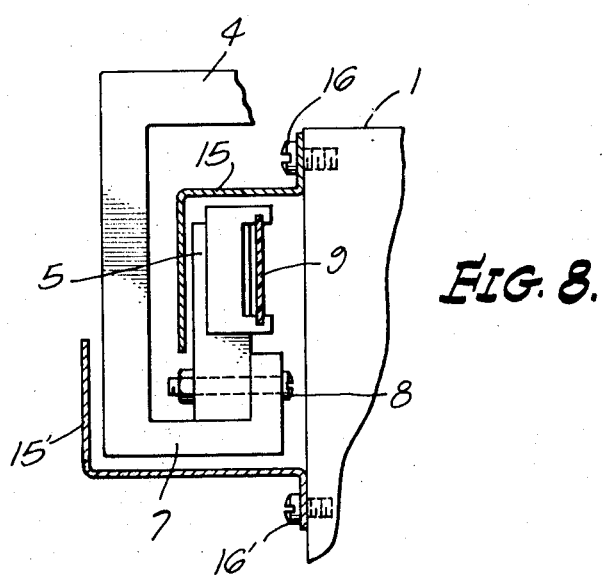
INVENTOR
HAROLD J. HASBROUCK
BY W. E. Beatty
ATTORNEY

United States Patent Office 3,522,568
Patented Aug. 4, 1970

3,522,568
TAPE SCALE FOR POSITION MEASURING TRANSFORMER
Harold J. Hasbrouck, Teaneck, N.J., assignor to Inductosyn Corporation, Carson City, Nev., a corporation of Nevada
Filed Mar. 13, 1969, Ser. No. 806,820
Int. Cl. H01f 21/04
U.S. Cl. 336—20                                    17 Claims

ABSTRACT OF THE DISCLOSURE

A position measuring transformer for a machine tool comprising a scale member secured to the machine tool and a slider member secured to the movable carriage of the machine tool in which the scale member comprises a planar continuous winding disposed on an elongated base of elastic material, one end of the base being rigidly mounted to the machine tool and the other end thereof being attached to the machine tool by a pre-loaded tensioning mount, the remainder of the base being separated from the surface of the machine tool. The continuous winding has a plurality of conductor portions extending transversely to the longitudinal axis of the base and the tensioning mount is adapted to stretch the base to adjust the spacing between adjacent conductor portions so as to accurately calibrate the transformer. According to a preferred embodiment, the base is spring steel and the winding is insulated from the base by an elastic insulating material. The slider member, which also has a planar winding disposed thereon, includes guide means which simultaneously supports the base to prevent sagging thereof and maintains a uniform air gap between the windings on both members so as to insure uniform inductive coupling between the slider member and scale member throughout the length of travel of the slider member.

BACKGROUND OF THE INVENTION

Field of the invention

The present invention relates to a tape scale for a position measuring transformer and, more particularly, to an elastic scale member which is mounted at the opposite ends thereof by tensioning means to a machine tool, the scale member supporting a continuous planar winding, the tensioning means being effective to adjust the spacing between adjacent portions of said winding.

Description of the prior art

Position measuring transformers of the type having a stationary scale member and a relatively movable slider member, each of the members supporting multi-polar windings which are inductively coupled so as to provide information as to the relative positions of the scale member and slider member are well known and widely used. One such position measuring transformer is described and claimed in U.S. Pat. No. 2,799,835 issued July 16, 1957, to Robert W. Tripp et al. for Position Measuring Transformer. In such patent, the scale member includes a continuous winding disposed on a rigid support or base and the slider member includes quadraturely related groups of windings also disposed on a rigid support or base. The windings of both members have active conductor portions which are parallel and extend transversely to the direction of relative movement between the members. Such position measuring transformers, as described in the above patent, have been marketed under the registered trademark Inductosyn.

A highly accurate form of Inductosyn positioning measuring transformer is described in U.S. Pat. No. 3,202,948 issued Aug. 24, 1965, to Clair L. Farrand for Precision Transducer. According to that patent, the scale member is constructed in the form of individual scale units each of which may, for example, be approximately 10 inches in length. Each scale unit comprises a rigid base of metal or insulating material having bonded thereto a transformer winding composed of a sheet of conductors arranged transverse to the direction of motion and serially connected. In the case where the base is made of metal, the conductor sheet is bonded to and insulated from the base by means of a bonding material.

In order to provide for continuous and accurate measurements, the individual scale units must be accurately mounted and positioned with respect to each other on a machine tool. In the first instance, a flat surface, machined to very close tolerances, must be provided on the machine tool. If such a surface is not readily available on the machine tool, a long plate must be built and positioned on the machine before the scale units can be mounted. Thereafter, a number of mounting holes must be drilled and taped into the machine or plate to mount the scale units. The individual units must be accurately aligned and spaced to preserve uniform spacing of the active conductors of one unit to the next active conductor on the adjacent unit. Finally, electrical connections must be made to each scale unit and the circuits brought together.

Precision transducers of the type described in the aforementioned Pat. No. 3,202,948 are expensive, with the installation procedure being time-consuming and costly. Where precision is paramount and highly accurate measurements must be made, such position measuring transformers are highly suitable and costs justified. However, for other applications where the precision of the separated scale units is not necessary, a simple, inexpensive economical and reliable position measuring transformer would be more appropriate.

In addition, scale members having rigid bases often develop manufacturing discrepancies which could cause the position measuring transformer to produce measuring errors. Therefore, it would also be desirable to produce a scale member which could be installed in such a way as to compensate for these manufacturing discrepancies.

SUMMARY OF THE INVENTION

According to the present invention there is provided a one-piece, economical and reliable scale member for a position measuring transformer which may be simply and inexpensively mounted to any existing machine tool. The present scale member completely eliminates the requirement for a flat surface or mounting plate on the machine tool, the need for accurately positioning a plurality of scale units on the machine tool and the requirement for making electrical connections to each scale unit and bringing all the circuits together. By way of contrast, the present scale member is not only inexpensive to begin with, but requires only two mounting members and only a single pair of electrical connections. In addition, the present scale member may be accurately calibrated after installation on the machine tool, thereby eliminating both the requirement for accurate positioning of separate scale units and discrepancies which result during manufacture.

Briefly, the present scale member comprises an elongated base of elastic material having mounted thereon a planar continuous winding consisting of a plurality of uniformly spaced and adjacent conductors. The winding is insulated from the base member by a material which is also elastic. One end of the scale member is rigidly mounted to a machine tool and the other end is attached to the machine tool by a tensioning means. The mounting is such that the individual conductors on the scale member extend transversely to the machine axis along which measurements are to be made.

The continuous winding of the scale member is made so that the spacing of the conductors is slightly reduced from the normal spacing. Thereafter, when the scale is mounted on the machine tool, the tensioning means stretches the scale member to thereby adjust the spacing between adajacent conductors until a desired spatial relaship is established.

The position measuring transformer also comprises a slider member which consists of geometrically related groups of windings produced on a rigid support which is attached to a moving part of the machine. The slider member also includes guide means which operate to support the scale member to prevent sagging thereof and to maintain a fixed air gap between the slider and scale so as to permit uniform inductive coupling between the two members throughout their entire lengths.

The windings of the slider member are energized by alternating voltages whose amplitudes are trigonometrically related to the geometrical spacing of the windings. In addition, the windings of both members are inductively related so that an output voltage may be derived from the scale winding which relates to the relative position between the two members.

It is, therefore, an object of the present invention to provide a scale member for an Inductosyn type position measuring transformer in which the continuous winding member of the scale is produced on a continuous base in the form of an elongated tape which can be stretched substantially straight.

It is a further object of the present invention to provide a position measuring transformer having an elastic tape scale member which can be easily installed on a machine tool.

It is a still further object of the present invention to provide a scale member for a position measuring transformer which is separated from the machine tool except at the opposite ends thereof.

It is another object of the present invention to provide a scale member for a position measuring transformer which is rigidly mounted at one end thereof to a machine tool and which is spring-mounted at the other end thereof to the machine tool by a tensioning mount.

It is still another object of the present invention to provide a scale member for a position measuring transformer which is adapted to readily minimize manufacturing errors.

Another object of the present invention is the provision of a scale member for a position measuring transformer in which a continuous winding is mounted on an elastic metal base using an insulating material which is also elastic.

Still another object of the present invention is the provision of a tape scale member for a position measuring transformer in which ambient temperature effects are minimized.

Still other objects, features and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

BRIEF DESCRIPTION OF THE DRAWING

FIG. 2 is a front elevation view of a position measuring transformer including a slider member and elastic scale member and showing the manner in which the scale member may be spring-mounted to a machine tool;

FIG. 3 is a cross-sectional view taken along the line 3—3 in FIG. 2 showing the guide members attached to the slider member for automatically maintaining alignment between the slider and scale members throughout the entire length of the scale;

FIG. 4 is a view taken along the line 4—4 in FIG. 3 showing the slider member and the grups of quadraturely related windings disposed thereon;

FIG. 6 is a cross-sectional view taken along the line 6—6 in FIG. 2 showing the details of the tensioning means;

FIG. 7 is a cross-sectional view taken along the line 7—7 in FIG. 2 showing one embodiment of a means for placing a tensioning force on the scale member; and FIG. 8 is a view, partly in section, taken along the line 8—8 in FIG. 1 showing the relationship between the scale member, the slider member, the movable carriage, the dust cover, and the air baffle.

DESCRIPTION OF THE PREFERRED EMBODIMENTS

Figure 1:
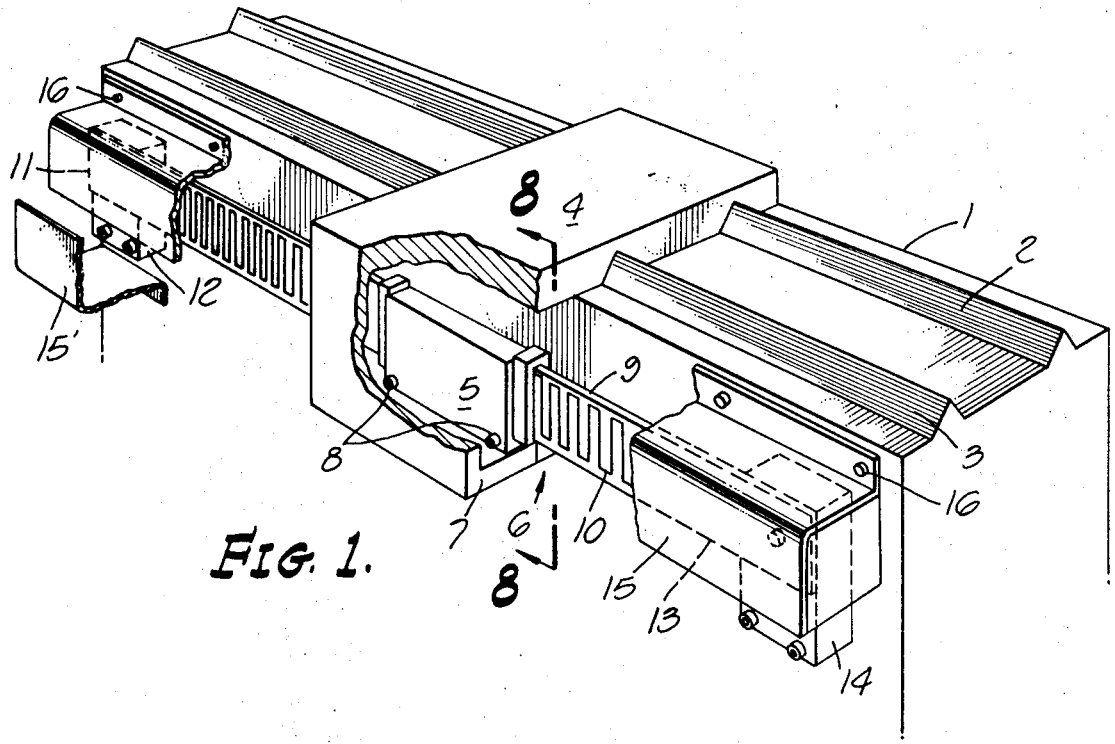
FIG. 1 is a perspective view of a position measuring transformer constructed in accordance with the teachings of the present invention comprising an elastic scale member and a rigid slider member, the entire configuration being protected by a dust cover and air baffle.

Referring now to the drawings and, more particularly, to FIGS 1 and 8 thereof, there is shown a portion of a machine tool 1 comprising a pair of machine ways 2 and 3 on which a carriage 4 is supported and driven along a first axis of machine tool 1, which machine axis may, for purposes of description, be considered the Y axis of machine tool 1. A slider member 5, which forms one part of a position measuring transformer 6, is rigidly attached to the lower portion 7 of carriage 4 by any suitable means such as nut and bolt means 8 for movement with carriage 4 along the Y axis. Position measuring transformer 6 further comprises a scale member 9 on which is mounted a continuous winding 10. Scale member 9 is mounted in a vertical plane along the Y axis of machine tool 1 and comprises a first end 11 mounted by spring mounting means 12 to machine tool 1 and a second end 13 mounted by rigid mounting means 14 to machine tool 1. The exact manner of mounting scale member 9 to machine tool 1 and the reason for the spring and rigid mountings will be described more fully hereinafter.

Lower portion 7 of carriage 4 serves to partially enclose slider member 5 and scale member 9 to assist in protecting members 5 and 9 from air currents, temperature changes, etc. Furthermore, the embodiment of FIG. 1 also comprises a cover 15 rigidly mounted at the top thereof to machine tool 1 by screw means 16. Cover 15 is effective to prevent air currents and dust particles from interfering with position measuring transformer 6. Finally, an additional cover 15' rigidly mounted at the bottom thereof to machine tool 1 by screw means 16' is operative to enclose lower portion 7 of carriage 4, thereby acting as an air baffle. Without covers 15 and 15', air currents could cause the length of scale member 9 to change and therefore cause the position measurement to be in error. Covers 15 and 15' also prevent dust particles, chips, etc. from machine tool 1 from falling into position measuring transformer 6.

Although position measuring transformer 6 is shown connected to machine tool 1 for making measurements along one axis only, namely the Y axis, it should be understood that additional position measuring devices can be mounted along the X and Z axes of machine tool 1 to make measurements along those axes.

Referring now to FIGS. 2–7, there is shown a slightly different embodiment of the present invention, with covers 15 and 15' of the FIG. 1 embodiment being omitted for purposes of description, comprising a position measuring transformer 17 including a slider member 18 and a scale member 19 mounted with respect to a machine tool 20.

As will be described more fully hereinafter, scale member 19 is an elastic tape on which a continuous winding 21 is affixed. A first end 22 of scale member 19 is rigidly mounted to a fixed bar 23 of machine tool 20 by means of a threaded screw 24 which passes through an opening in end 22 of scale member 19 and mates with a threaded hole in bar 23. The other end 25 of scale member 19 is spring-mounted to a tensioning means 26. As shown most clearly in FIGS. 2 and 6, tensioning means 26 comprises an angle bracket 27 having a base 28 fastened to machine tool 20 by screws 29 and 29'. Angle bracket 27 further comprises a right angle flange 30 having an opening 60 therein which forms a slide bearing for the threads 31 on the shank of a bolt 32. Bolt 32 has an elongated head 33 including a slot 34 which receives end 25 of scale member 19. Scale member 19 and the opposing sides of slot 34 have aligned apertures 61 and 61' to receive a coupling pin 35.

As shown most clearly in FIGS. 2 and 7, the spring loading force on scale member 19 is applied by a pair of springs 36 and 36', the latter not being shown, enclosed within a pair of hollow spring barrels 37 and 37', respectively, which are screwed to the correct position in a movable housing 38 and locked in position by lock screws 39 and 39', respectively. A pair of plungers 40 and 40', partially enclosed within spring barrels 37 and 37', respectively, contact the back surface 62 of flange 30 of angle bracket 27 when a tensioning nut 41 is rotated on threads 31 of bolt 32. A lock nut 42 secures tensioning nut 41 in place on bolt 32.

As shown in FIG. 7, one end of plunger 40 is in contact with surface 62 of angle flange 30. Spring 36 inside barrel 37 is compressed between a screw 63 which encloses barrel 37 and the other end 64 of plunger 40. The amount of spring loading force applied to scale member 19 is determined by the degree of engagement of tensioning nut 41 on threads 31 of bolt 32 as will be described more fully hereinafter.

Referring now solely to FIG. 2, continuous winding 21 of scale member 19 comprises a series of adjacent and parallel conductors 43 extending transversely to the longitudinal axis of scale member 19 and the Y axis of machine tool 20. Conductors 43 are in the shape of hairpins and, in one embodiment, may have a center to center spacing of 0.100 inch. Three adjacent conductors form a cycle, that is a north pole and a south pole, when activated by an induced voltage from slider member 18.

Continuous winding 21 may also include return conductors 44 and 44' on both the top and bottom of scale member 19 to reduce single turn loop coupling between the leads of the scale and slider members, in addition to the coupling between the windings themselves, as described in U.S. Pat. No. 2,915,721 issued Dec. 1, 1959 to Clair L. Farrand for Reduction of Single-Turn Loop Coupling in Position-Measuring Transformers. Additional details on conductors 43 of continuous winding 21 as well as on the operation of a position measuring transformer of the Inductosyn type, may be found in the aforementioned U.S. Pat. No. 2,799,835 as well as in U.S. Pat. No. 3,090,934 issued May 21, 1963 to Clair L. Ferrand for Reduction of Unwanted Coupling Between Transformer Members of Position-Measuring Transformers.

The present scale member 19 differs from the scale members described in the reference patents in that continuous winding 21 of scale member 19 is mounted on an elongated base of elastic material instead of on a rigid support member. The elastic base or tape may have a height, for example, of three-quarters of an inch. Although various materials may be used for the tape to permit precision measurements, chrome-plated spring steel is preferred for its flexible and elastic characteristics at the lengths and thicknesses involved. Tempered steel and clock steel may also be used. Furthermore, although the steel metals are preferred for precision measurements, other metals, and non-metals such as rubber, elastic, resin, etc. may be used for less precise measurements.

In the case where scale member 19 is a metal, an insulating material, which is also elastic, is positioned between continuous winding 21 and scale member 19. According to a preferred embodiment of the present invention, scale member 19 may have a length of 72 inches and a thickness of 0.012 inch of which approximately 0.003 inch is the thickness of the insulating adhesive between the metal base and conductors 43 forming continuous winding 21. The adhesive may be comprised of a thermo-setting material such as a film of phenolic resin.

Continuous winding 21 may be produced by photo-etching techniques on an insulating layer 45 adhesively disposed over the surface of the metal strip. Winding 21 may be etched from a copper layer which is bonded to the metal strip by the thermo-setting resin. Ordinarily, a pressure of 100° p.s.i. and a temperature of 300° F. for one hour is used to achieve a bond between the copper layer and the metal tape. The process of etching a conducting metal sheet such as copper, silver, etc. to form a conductor pattern on an insulated base is well known to persons skilled in the art. For that reason, additional details are not included.

According to the present invention, the individual conductors 43 of continuous winding 21 are produced with a spacing slightly less than the spacing the conductors should have when scale member 19 is mounted for operation on machine tool 20. In one process, the reduced spacing is achieved by spring loading the metal strip and, therefore, the copper layer, when the pattern for the continuous winding is printed on the surface of the copper layer. Generally, the spring loading is approximately the same loading which is applied when the scale is mounted to the machine. After the pattern is printed on the tape, the loading is removed and the spacing of the conductors is reduced accordingly. As a result, the conductors have a spacing which is slightly reduced from the normal spacing as a function of the anticipated spring loading on scale member 19 during normal operation. Thereafter, with ends 22 and 25 of scale member 19 secured to machine tool 20 in the manner described hereinbefore, and to be described more fully hereinafter, scale member 19 is stretched until the desired spacing between conductors 43 is achieved. Not only is the tape stretched when scale 19 is spring-mounted to the machine tool 20, but conductors 43 and adhesive 45 are also stretched.

More specifically, and referring again to FIGS. 2, 6 and 7, spring barrels 37 and 37' are ordinarily inserted inside housing 38 so that when scale 19 is fully loaded, a part of plungers 40 and 40' still project from spring barrels 37 and 37' outside of housing 38, as shown in FIG. 7. Spring barrels 37 and 37' are then locked in position with lock screws 39 and 39', respectively. Initially, tensioning nut 41 is loosened so that apertures 61 and 61' can be aligned. With apertures 61 and 61' aligned, and end 25 of scale member 19 inserted in slot 34 in head 33 of bolt 32, coupling pin 35 may be inserted to securely lock scale member 19 to bolt 33. Thereafter, rotation of tensioning nut 41 applies a tension to bolt 33 and scale member 19.

As seen in FIG. 7, housing 38 is not connected to the underlying surface of machine tool 20. As a result, when tensioning nut 41 is rotated, for example, clockwise, housing 38 is urged to the left. In other words, as the length of bolt 32 between angle flange 30 and scale member 19 is reduced, springs 36 and 36' are compressed to stretch scale member 19 as described hereinafter.

Referring now to FIGS. 2–5, slider member 18 is connected to a carriage 50 of machine tool 20 for movement therewith along the Y axis relative to scale member 19 which is mounted to machine tool 20 as previously described. Screws 51 and 51' secure slider 18 to carriage 50. Guide means 52 and 52' are mounted on the opposite ends of slider 18 by screw means 53 and 53', respectively. Guide means 52 and 52' are used to maintain parallel alignment between scale member 19 and slider member 18 throughout the length of travel of slider member 18. Guide means 52 and 52' also support scale member 19, if necessary, to prevent sagging.

As shown most clearly in FIG. 3, guide means 52 comprises a pair of shoes 54 and 54' having notches 55 and 55', respectively, which contact the top and bottom, respectively, of scale member 19 and maintain an air gap 56 between scale member 19 and slider member 18. The sides of notches 55 and 55' are slightly inclined so that winding 21 on scale member 19 is not in frictional contact with the sides of the notches during relative motion of slider 18 and scale 19. However, slots of different configurations are also within the scope of the present invention.

Shoes 54 and 54' are secured to slider member 18 by means of screw means 53 and 53', respectively, which can be loosened to permit guide members 54 and 54' to be adjusted to accommodate a particular height of scale member 19 and in order to adjust the width of air gap 56. As a practical matter, conductors 44 and 44' are spaced from the outer edges of scale member 19 by approximately 1/16 of an inch so that slots 55 and 55' cannot make frictional contact therewith. According to a preferred embodiment, an air gap of approximately one hundredths of an inch should be maintained between scale 19 and slider 18 throughout the range of motion to insure proper inductive coupling.

Slider member 18 has mounted thereon a pair of quadrature windings, generally designated 49. Conductors 47, 47', 48 and 48' supply precise sine and cosine voltage potentials to quadrature windings 49 of slider 18. The voltage potentials are related as the sine and cosine of the space phase in the pole cycle of the continuous windings 21 on scale member 19. An additional pair of conductors 46 and 46' are soldered to the return conductors 44 and 44' and to the end of continuous winding 21, respectively, to connect the voltage induced in continuous winding 21 to an error amplifier and phase detector as is well known in the art.

Figure 5:
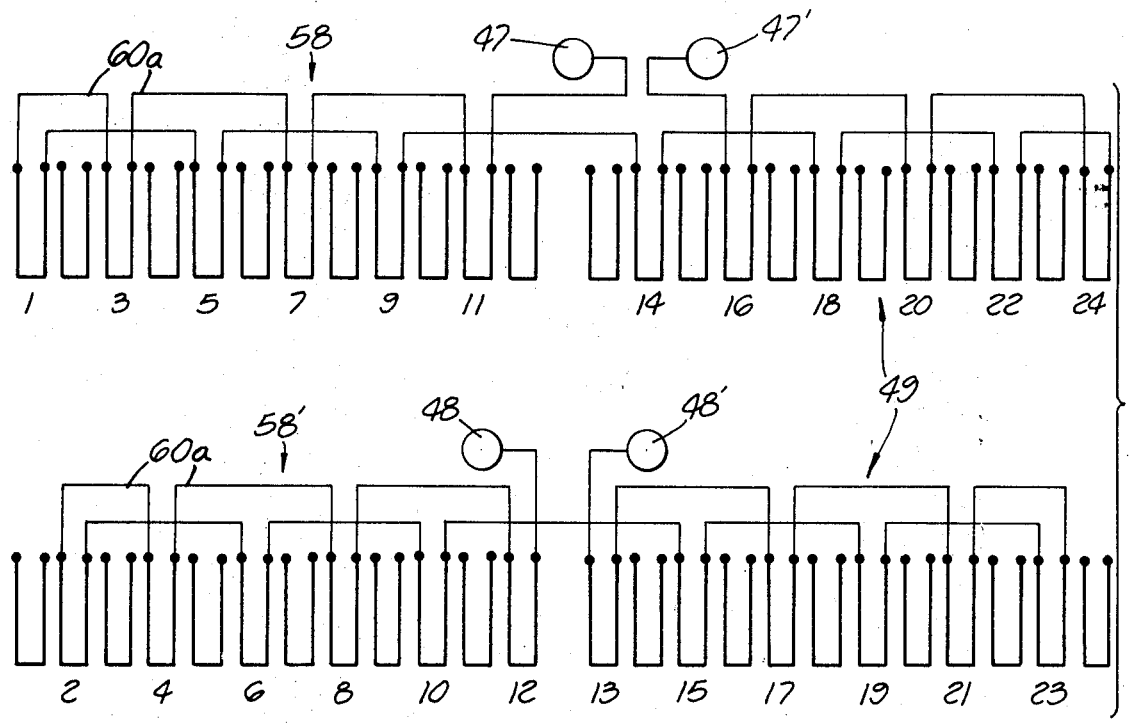
FIG. 5 is a schematic diagram of the quadrature windings of the slider member.

Quadrature windings 49 comprise, for example, 24 groups of hairpin shaped conductors. Twelve of the groups of conductors, namely 1, 3, 5, 7, 9, 11, 14, 16, 18, 20, 22 and 24 comprise one quadrature winding 58, as shown in FIG. 5, while the remaining twelve of the groups of conductors, namely 2, 4, 6, 8, 10, 12, 13, 15, 17, 19, 21 and 23 comprise another quadrature winding 58'. According to one embodiment, the interconnection of the groups of conductors is achieved by means of conductors 60a which pass through slider member 18 into a trough (not shown) mounted on the opposite surface of slider 18. The dotted lines 59 and 59' in FIG. 4 represent the height of scale member 19.

Quadrature windings 49 may be produced by a photoetching process or by other processes well known to those skilled in the art for forming electrically conducting conductors in a pattern on an insulating layer disposed over a supporting base. The base may be comprised of hot rolled steel or other metal as described in the beforementioned U.S. Pat. No. 3,202,948. Alternatively, the pattern may be formed directly on a base comprised of a glass or similar material as described in the before-mentioned U.S. Pat. No. 2,799,835.

The schematic illustration of quadrature windings 58 and 58' in FIG. 5 shows the windings balanced about a central line so that any change in the dimensions of slider member 18 has the same effect on both of windings 58 and 58' for eliminating "quadrature shift" as described in U.S. Pat. No. 2,915,722 issued Dec. 1, 1959 to V. F. Foster for Pattern for Slider of Position Measuring Transformer. As described in that patent, the conductor groups comprising the quadrature windings are arranged so that the conductor groups of one quadrature winding which carry current in one direction are at opposite relative positions of a current path with respect to the conductor groups of the other quadrature winding.

In operation, before initiating normal machine operations using the present position measuring transformer, scale member 19 must be properly calibrated so that it is accurate within prescribed limits. For example, the accuracy should be within plus or minus two-ten-thousandths of an inch (.002 inch) for the first foot at 68° F. and plus or minus one-ten-thousandths of an inch (.0001 inch) for each additional foot for the length of scale member 19 which may be, for example, 72 inches long.

Several methods can be used to determine the required tension on scale member 19. For example, a gauge block which may be 10 inches long and a dial indicator may be used. Tensioning nut 41 is then tightened until a 10 inch length of tape scale member 19 is correct according to the gauge block. In using the gauge block indicator, two error signal nulls should be found approximately 10 inches apart by moving carriage 50 and slider member 18 therewith. The nulls may not be exactly 10 inches apart because tape scale 19 has not been pulled tightly enough. However, in two or three trials, during which tensioning nut 41 is adjusted, the exact positions of the nulls can be fixed. Use of a gauge block and dial indicator is well known to persons skilled in the art so that additional details are not necessary.

In another method, it is necessary to determine the pull initially at the factory. That determination can be made, for example, by comparing tape scale 19 with a precisely made scale used as a standard. One slider is mounted for movement relative to the standard scale and another slider is mounted for movement relative to the tape scale. A computer receives the error signals from both and indicates the difference between the error readings from both scale members. Tension on the tape scale member is adjusted until the accuracy is within the specified tolerance for the length of the scale. That tension, as a spring force in pounds, is recorded so that when the tape scale is installed at a customer installation, it can be placed under that tension.

Longitudinal stiffness of tape scale 19 is such that a ten pound pull produces approximately a .005 inch extension of scale 19 for the exemplary conditions described herein. Under a ten pound pull, tape scale 19 is relatively rigid. Some scale member 19 is relatively flexible when it is not spring loaded, it can be easily packaged for shipment to a facility.

It should be noted that although the specific embodiment of position measuring transformer 17 is shown attached to a machine tool 20 along its Y axis (horizontally), the invention is not limited to such uses. A tape scale can be installed for measuring movements along X and Y axes simultaneously or independently of measurements made along other axes of a multi-axis machine tool. In addition, although a linear type position measuring transformer has been shown and described, in other embodiments, the tape scale may be disposed in a circular manner to produce a rotary type position measuring transformer.

While the invention has been described with respect to several physical embodiments constructed in accordance therewith, it will be apparent to those skilled in the art that various modifications and improvements may be made without departing from the scope and spirit of the invention. For example, the insulating material positioned between continuous winding 21 and scale member 19 may be the same insulating material as that described in the beforementioned U.S. Pat. No. 3,202,948. Furthermore, although the tape scale has been disclosed as being mounted to a machine tool with a rigid mount at one end and a tensioning mount at the other end, it will be apparent that the tensioning mount may be replaced, after final installation, by a rigid mount since the proper tension has been established by the tensioning mount. In this instance, since both ends of the tape scale would be rigidly mounted to the machine tool and under proper tension, the length of the scale would then follow directly the expansion or contraction of the machine tool axis to which it is fastened.

I claim:

1. A position measuring transformer comprising an elastic base member having insulatingly mounted thereon a continuous electrical winding having a plurality of uniformly spaced and adjacent conductor portions disposed side by side and extending transversely of the longitudinal axis of said base member and connected in series for opposite directions of current flow in adjacent active conductor portions, and means for retaining said base in stretched condition with increased separation of said active conductor portions.

2. A position measuring transformer according to claim 1, said retaining means comprising a spring tensioning member connected to one end of said elastic base member.

3. A position measuring transformer according to claim 1 wherein said base member comprises an elastic strip of steel and wherein an insulating layer is disposed between said base member and said winding.

4. A position measuring transformer according to claim 1 wherein said base member comprises a clock spring and an elastic insulating layer of thermosetting resin interposed between said spring and said winding.

5. A position measuring transformer according to claim 1 wherein said elastic means is a metallic strip mounted edgewise vertically with its longitudinal axis extending in a horizontal direction.

6. A position measuring transformer according to claim 2 comprising first and second relatively movable members, said base member having one end thereof connected to a first one of said relatively movable members, said spring tensioning member being connected between the other end of said base member and the first one of said relatively movable members.

7. A position measuring transformer according to claim 2 wherein said holding means includes means for adjusting the amount of spring tension on said base member.

8. A position measuring transformer according to claim 2 comprising first and second relatively movable members, said base member having one end thereof connected to a first one of said relatively movable members, said spring tensioning member being connected between the other end of said base member and the first one of said relatively movable members, said second member comprising a slider having an insulating support and two windings disposed on said support in space quadrature of the pole cycle of the winding of said base member.

9. A position measuring transformer according to claim 2 comprising first and second relatively movable members, said base member having one end thereof connected to a first one of said relatively movable members, said spring tensioning member being connected between the other end of said base member and the first one of said relatively movable members, a slider secured to a second one of said relatively movable members, said slider having a plurality of series connected groups of parallel conductors forming a plurality of windings and means slideably connecting said base member and said slider for maintaining said windings of said base member and said slider in spaced inductive relation.

10. A position measuring transformer according to claim 9 wherein said maintaining means comprises slot means disposed on both edges of said slider for the opposite edges of said base member for providing mutual alignment of said base member and said slider.

11. A position measuring transformer according to claim 8 wherein said maintaining means comprises means providing opposed V-shaped notches on said slider providing alignment for the opposite edges of said base member.

12. A position measuring transformer comprising relatively movable scale and slider transformer members, said scale member having a continuous winding mounted on a base in the form of an elongated tape, said slider having sine and cosine windings in space quadrature of the pole cycle of said continuous winding, said slider comprising a base providing notches slidably receiving the opposite edges of said tape to maintain said slider windings spaced from said continuous winding by a small air gap, means for mounting the opposite ends of said tape on a machine member with said tape stretched substantially straight, a cooperating machine member having means supporting said base of said slider for movement of said slider relative to said tape.

13. A position measuring transformer comprising relatively movable scale and slider transformer members, said scale member having a continuous winding mounted on a base having opposite longitudinally extending relatively thin edges, said slider having sine and cosine windings in space quadrature of the pole cycle of said continuous winding, said slider comprising a base having means providing spaced notches at each of its opposite edges, the notches of each edge slidably receiving one of the opposite edges of said tape to maintain said slider windings spaced from said continuous winding by a small air gap during movement of said slider relative to said scale.

14. A position measuring transformer for use with first and second relatively movable members for determining the relative positions of said members along a preselected axis aligned with the direction of relative motion comprising:
an elongated base of elastic material connected at its opposite ends to said first member, said base having disposed thereon a continuous electrical winding having parallel conductor portions extending transversely to the longitudinal axis of said base with three adjacent conductor portions forming a pole cycle, said longitudinal axis being parallel to said preselected axis;
a slider member connected to said second member, said slider member including quadrature windings energized with voltage potentials having amplitudes related as the sine and cosine of the space phase in the pole cycle of said continuous winding on said base; and
tensioning means connected between one end of said base and said first member for stretching said base to adjust the spacing between said conductor portions, said tensioning means being operative to apply such force to said base as is required to produce voltage gradients along said base at predetermined positions as a function of the position of certain of said pole cycles.

15. A position measuring transformer for use with first and second relatively movable members for determining the relative positions of said members along a preselected axis aligned with the direction of relative motion comprising:
an elongated base of elastic material connected at its opposite ends to said first member, said base having disposed thereon a continuous electrical winding having conductor portions extending transversely to the longitudinal axis of said base, said longitudinal axis being parallel to said preselected axis;
a slider member connected to said second member, said slider having a plurality of series connected groups of parallel conductors forming a plurality of windings;
tensioning means connected between one end of said base and said first member for stretching said base to adjust the spacing between said conductor portions; and
means for adjusting the force of said tensioning means.

16. A position measuring transformer according to claim 15 wherein said adjusting means comprises:
bracket means rigidly secured to said first member, said bracket means having an aperture therethrough, said one end of said base extending through said aperture; slideable housing means, said one end of said base being operatively connected to said housing means; and compressible means operatively positioned between said bracket means and said housing means for urging said housing means and said one end of said base away from said bracket means and the other end of said base.

17. A position measuring transformer according to claim 16 wherein said slidable housing means has an aperture therethrough and further comprising:
 a bolt connected to said one end of said base, said bolt extending through said apertures in said bracket means and said housing means; and
 a tensioning nut threadably engaging said bolt, said nut preventing withdrawal of said bolt from said aperture in said housing means whereby rotation of said nut causes movement of said housing means toward said bracket means thereby compressing said compressible means and stretching said base.

References Cited

UNITED STATES PATENTS

| | | | |
|---|---|---|---|
| 1,568,470 | 1/1926 | Rodman | 336—115 |
| 2,252,919 | 8/1941 | Eckard | 336—116 XR |
| 2,799,835 | 7/1957 | Tripp et al. | 336—129 XR |
| 2,866,946 | 12/1958 | Tripp | 336—129 XR |
| 2,915,722 | 12/1959 | Foster | 336—115 |
| 3,090,934 | 5/1963 | Farrand | 336—129 |
| 3,202,948 | 8/1965 | Farrand | 336—115 |

THOMAS J. KOZMA, Primary Examiner

U.S. Cl. X.R.

336—115, 129, 200